United States Patent
Hiroyama et al.

(10) Patent No.: US 7,883,418 B2
(45) Date of Patent: Feb. 8, 2011

(54) NETWORK GAME TERMINAL, GAME SERVER, METHOD FOR HANDLING NETWORK GAMES, AND RECORDING MEDIUM

(75) Inventors: Yasunari Hiroyama, Tokyo (JP); Kazuo Kato, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1403 days.

(21) Appl. No.: 10/927,190

(22) Filed: Aug. 27, 2004

(65) Prior Publication Data

US 2005/0054447 A1 Mar. 10, 2005

(30) Foreign Application Priority Data

Sep. 1, 2003 (JP) ............................. 2003-308503
Aug. 18, 2004 (JP) ............................. 2004-238837

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................. 463/42; 463/20; 463/39; 463/40; 463/41; 463/43

(58) Field of Classification Search .................. 463/20, 463/42, 39, 40, 41, 43
See application file for complete search history.

(56) References Cited

U.S. PATENT DOCUMENTS

| 4,856,787 A * | 8/1989 | Itkis ............................. 273/237 |
| 6,524,189 B1* | 2/2003 | Rautila ......................... 463/40 |
| 6,687,700 B1* | 2/2004 | Cornelius et al. ............. 707/10 |
| 2002/0147046 A1* | 10/2002 | Wang ........................... 463/42 |
| 2002/0183115 A1* | 12/2002 | Takahashi et al. .............. 463/42 |
| 2003/0114226 A1* | 6/2003 | Kimura ........................ 463/42 |
| 2004/0185936 A1* | 9/2004 | Block et al. ................... 463/42 |
| 2006/0287095 A1* | 12/2006 | Mattice et al. ................ 463/42 |

* cited by examiner

*Primary Examiner*—David L Lewis
*Assistant Examiner*—Adetokunbo Torimiro
(74) *Attorney, Agent, or Firm*—Matthew B. Dernier; Gibson & Dernier LLP

(57) ABSTRACT

For reducing the load on a server as much as possible during transfer of data from the server to a terminal, each terminal is capable of playing out a network game in cooperation with a local network game terminal. To this end, the local network game terminal and one or more other network game terminals are grouped in the local network game terminal. Additionally, group information is generated with which the game server 1 can recognize the grouped terminals as one user group, and representative terminal information is also generated with which other network game terminals in the same user group can recognize that the local network game terminal is the representative terminal. Bi-directional communications, including transfer of the data received from the game server 1 and the representative terminal information, are made with other network game terminal(s) in the user group.

15 Claims, 8 Drawing Sheets

NETWORK GAME TERMINAL, GAME SERVER, METHOD FOR HANDLING NETWORK GAMES, AND RECORDING MEDIUM

CROSS REFERENCE TO RELATED APPLICATIONS

The present application claims priority from Japanese Application Nos. 2003-308503 filed Sep. 1, 2003 and 2004-238837 filed Aug. 18, 2004, the disclosures of which are hereby incorporated by reference herein.

BACKGROUND OF THE INVENTION

The present invention relates to a plurality of terminals that executes a program over a network such as the Internet to perform collaborative activities, and a server for these terminals. For example, the present invention relates to groupware, terminals on which online games such as massive multi-player online (MMO) games are played, a server for such terminals, a technique for transmitting data between the server and these terminals, and a technique for grouping the terminals.

Data transmission between a server and a plurality of terminals associated with the server over a network (e.g., the Internet) is used for joint operations and simultaneous processing among two or more users. This can be found in, for example, groupware designed for organizing/managing schedules of two or more users, groupware designed for BBS sharing, and online games that allow users to achieve a certain purpose within the same virtual space.

Such data transmission requires simultaneous flows of a large amount of data from a server to a plurality of terminals. For example, groupware may transmit, to each terminal, shared data for a scheduling database or a BBS. An online game program may transmit, to terminals of individual users, graphics data to provide a virtual space in the game, e.g., a grotto or a field, data associated with bodily powers and belongings of users (players).

Massive multi-player online games in particular require transmission of data-intensive animated images that are beautiful to look at in order to give variety to the game. Status and parameters which are associated with stamina and/or belongings of characters in the game controlled by the users change every second. An ongoing game program is required to update the ever-changing gaming status and parameters as soon as possible.

Furthermore, typical massive multi-player online games allow an in-game character to recruit other in-game characters as a member of the party he or she belongs to. This recruiting is done in, for example, a virtual lobby leading into the main feature of the game. After finding necessary members, the in-game character forms a party with these members to achieve a certain purpose in the main feature.

The server (game server) managing the progress of a game is, however, connected to a huge number of network game terminals. The server may often be required to send a large amount of data to these network game terminals. The volume of data to be sent may possibly cause some problems especially when it exceeds a certain limit. Such problems include a delay of processing in, for example, status update or a process lag like when a game gets bogged down.

The problem of a processing delay can partly be solved by reducing the amount of data for animated images. This, however, often sacrifices the quality of graphic images. Another possible solution would be to decrease the number of users allowed to connect to the server at a given period of time. A consequent lower quality of graphic images spoils fun of games. Decreasing the number of users allowed to connect to a single server raises the need for increasing the number of servers. This is disadvantageous by economic considerations.

Thus, for the proper data transmission between a server and a plurality of terminals associated with the server over a network such as the Internet, it is desired to provide a transmission technique that can reduce the load on the server as much as possible by achieving efficient transmission rather than by reducing the amount of information itself (e.g., reducing the quality of graphic images) to be transmitted to the terminals.

As to massive multi-player online games, in-game characters are typically allowed to recruit or gather around other in-game characters to form a party. This recruiting is done in a specified virtual space such as a virtual lobby. The user can spend time in the virtual lobby before stepping into the main feature of the game. After drawing necessary members into the game and grouping them to form a party, the user moves to the main feature of the game. Thus, online games of this type suffer problems that "no user can move to the main feature of the game before making up the necessary number of the members for the party and a gaming process is interrupted by this time-consuming process of collecting the members."

The time taken for grouping of network game terminals (formation of a party in the game) may be reduced if the game server automatically choose members to be joined in a party. In such a case, the game server may confirm the existing members' intent to add a new member to the party which they belong to. Automatic choice of a member after confirmation of other users' intent often increases the amount of data processing on the server because the server is connected to a large number of network game terminals. In addition, before the formation of a party, it is necessary to iron out the differences among users for confirmation of each user's intent to add a member to the party or for determination of the number of persons of a party necessary for a predetermined purpose. In order to cope with all of the above-mentioned requirements, it takes a lot of time for data processing and confirmation of users' intent. This makes automatic choice of party members practically unfeasible. Moreover, with conventional techniques, once a user whose in-game character belongs to a party goes offline (i.e., his or her game terminal is disconnected from the game server), the user is not allowed to return his or her in-game character to the same party. He or she should join in another party and consequently, grouping of the network game terminals should be done again from the beginning. This causes frequent occurrence of complicated grouping of the network game terminals. The user cannot go back to the game while keeping his or her original party, and continuity of the game is not ensured.

Therefore, it is desired to rapidly group network game terminals in deference to users' wishes, to reduce occurrence of grouping of the network game terminals, and to allow a user to return to the game after formation of a new party, ensuring continuity of the game.

SUMMARY OF THE INVENTION

In order to solve the above-mentioned problems, the present invention is to provide a network game terminal which is accessible to a game server through a predetermined network, comprising: first communication control means which is adapted to receive data from the game server over the predetermined network; means for generating user group data which is adapted to group the local network game terminal and one or more other network game terminal(s) as a user group in order to play out a network game in cooperation between the local network game terminal and other network game terminal(s) using data received from the game server through the first communication control means, means for generating user group data being also adapted to generate user group data, the user group data including group information with which the game server can recognize the grouped network game terminals as one user group, and representative terminal information with which other network game terminal(s) in the user group can recognize the local network game terminal as a representative terminal; and second communication control means which is adapted to send the data received from the game server and the user group data to other network game terminal(s) in the user group.

As described above, the data received from the game server through the first communication control means are used for cooperative play-out of a network game between the local network game terminal serving as the representative terminal and other network game terminal(s). The network game terminal(s) other than the local network game terminal receive(s) the data necessary for playing out the network game from the representative terminal rather than from the game server. The game server is required to send data necessary for cooperation between the representative terminal and the other network game terminal(s) only to the representative terminal. It is unnecessary to repeatedly send these data from the game server to the individual network game terminals. As compared with conventional combinations of a game server and network game terminals, in which login operations are performed every time when a network game terminal has logged in a game server, the present invention requires only the representative terminal to log in the game server. This reduces the amount of data exchanged between the game server and the user terminals in a user group, decreasing the load on the game server.

More preferably, the data necessary for cooperation between the local network game terminal (representative terminal) and other network game terminal(s) to play out an network game include data shared by the network game terminals including the local network game terminal in a user group. The data shared for the network game may be, for example, graphics data, map data, and position data indicating the position of an object such as a building in the game. In particular, when a group of network game terminals is visualized as a group of in-game characters corresponding to these terminals, the in-game characters may often be located at the same or very close positions. Therefore, graphics data necessary for producing a game screen on each network game terminal are associated with map data around the current position of the group of in-game characters. Such data are almost equally required for all network game terminal in the same user group.

Network game terminals according to a conventional technique should individually and repeatedly receive data from a game server, even when the data are commonly required for all network game terminals. On the contrary, the present invention achieves "bulk" reception of data from a game server. The data equally required for all network game terminals are transmitted from the game server to the representative terminal. The representative terminal then distributes these data to the remaining network game terminals in the user group. The data shared by the network game terminals in the user group are not repeatedly delivered from the game server to the network game terminals. The load on the game server can be decreased especially when graphics data which are typically of large capacity are exchanged.

Preferably, the user group data include a status of a user group, the position of a user group in the game, a representation of a user group in the game (e.g., the name and size of a ship when the user group is visualized as a ship), information about shared items for a user group. With this, each network game terminal can recognize the status of the user group.

Preferably, the network game terminal is provided with second recording means on which data received from the game server through the first communication control means are recorded. This allows the network game terminals other than the representative terminal in the user group to access the second recording means of the representative terminal to obtain data, when necessary.

Any one of suitable techniques may be used for the data transfer from the representative terminal to the remaining network game terminal(s). For example, the representative terminal may communicate with other network game terminal(s) in the user group in a peer-to-peer manner.

Preferably, there is provided a configuration comprising means for sending the data that were received through the first communication control means and recorded on the second recording means, to a new representative terminal when the local network game terminal is serving as the representative terminal, and either when the local network game terminal attempts to log out the game server or when the local network game terminal attempts to withdraw from the user group, the new representative terminal being selected from the network game terminals that are in communication with the local network game terminal in the user group which the local network game terminal belongs to. One of the network game terminals in the user group may receive data from the game server as the representative terminal and the network game terminal may comprise first recording means on which user group data are recorded. In such a case, the local network game terminal may determine that it is working as the representative terminal by, for example, accessing the representative terminal information recorded on the first recording means to identify the representative terminal. Alternatively, it may be determined according to whether the local network game terminal is receiving graphics data as the data that are commonly used in a network game from the game server.

Preferably, the present invention also provides that the first communication control means is for allowing the local network game terminal to communicate bi-directionally with the game server and the second communication control means is for allowing the local network game terminal to communicate bi-directionally with any one of other network game terminals in the user group, the network game terminal further comprising: terminal data recording means which is adapted to record, on the first recording means, terminal data of the local network game terminal as well as terminal data of the individual network game terminal(s) that are received from other network game terminal(s) in the user group, the terminal data being data indicating a status relating to a network game terminal; means for determining whether the user group which the local network game terminal belongs to includes one or more network game terminals in communication with the local network game terminal; and means for sending the group information recorded on the first recording means and the terminal data for each network game terminal, to the game server, if the determination means determines that no network game terminal is in communication with the local network game terminal when the local network game terminal is serving as the representative terminal, and either when the local network game terminal attempts to log out the game server or when the local network game terminal attempts to withdraw from the user group. In this case, the user group information recorded on the first recording means and the terminal data for each network game terminal are supplied to the game server.

Examples of the status associated with the network game terminal(s) include, the name and ID of a network game terminal, stamina of an in-game character corresponding to a network game terminal, coordinates, possessions, and connection status of the network game terminal (e.g., whether a network game terminal is in the logged in state or not).

It is preferable to provide a configuration in which the network game terminal comprises: terminal data recording means which is adapted to record, on the first recording means, terminal data of the local network game terminal as well as terminal data of the individual network game terminal(s) that are received from other network game terminal(s) in the user group, the terminal data being data indicating a status relating to a network game terminal; means for when the local network game terminal is serving as the representative terminal, and when a predetermined event occurs that affects the status associated with the network game terminal(s) in the progress of the network game reflecting the affect of the event to a status associated with a network game terminal in an offline state and updating the terminal data, and for when the network game terminal in the offline state has logged in again sending the updated terminal data to the logging-in network game terminal.

This configuration makes it possible to reflect any change with an event or the progress of a game to all characters in a game even when a network game terminal corresponding to a character is in the logged out state, providing more attractive and exciting game scenarios.

In addition, the present invention provides a game server to which the above-mentioned network game terminal has access, the game server comprising: means for recording the group information and the terminal data on third recording means, the group information and the terminal data being supplied from the network game terminal(s), the third recording means being provided on the game server; and means for sending the group information and the terminal data that are recorded on the third recording means to a new representative terminal when the representative terminal is abnormally disconnected from the network, the new representative terminal being selected from available network game terminals in the user group which the representative terminal had belonged to.

This configuration of the game server makes it possible to continue a network game by selecting a new representative terminal by using the group information recorded on the third recording means and the terminal data, even after the former representative terminal is abnormally disconnected. Preferably, the representative terminal supplies the group information, the terminal data, and other data necessary for playing out the game periodically or intermittently to the game server. The game server records the information and data on the third recording means (preferably by overwriting the former information and data). When the representative terminal is abnormally disconnected or when the group information and/or the terminal data recorded on the representative terminal are deleted for some reasons, the latest group information and/or terminal data or proper group information and/or terminal data without no data failure, that are recorded on the game server, are transmitted to a new representative terminal (or the representative terminal on which the group information and/or the terminal data have deleted). In this way, the game can be continued by minimizing an adverse effect due to abnormal disconnection of the representative terminal or deletion of the data.

Furthermore, the present invention may be provided as a method to be performed on a network game terminal which is accessible to a game server through a predetermined network, the network game terminal being adapted to receive data from the game server, the method comprising, by a control unit provided in the network game terminal, the step of grouping a local network game terminal and one or more other network game terminal(s) as a user group in order to play out a network game in cooperation between the local network game terminal and other network game terminal(s) using data received from the game server, and generating user group data, the user group data including group information with which the game server can recognize the grouped network game terminals as one user group, and representative terminal information with which other network game terminal(s) in the user group can recognize the local network game terminal as a representative terminal; the method also comprising, by the control unit, the step of sending the data received from the game server and the user group data to other network game terminal(s) in the user group.

In addition, the present invention may be provided as a recording medium on which a computer program is recorded, or as a computer program itself. For example, the present invention may be provided as a computer-readable recording medium on which a program is recorded that is used to allow a computer to function as: first communication control means which is adapted to receive data from the game server over the predetermined network; means for generating user group data which is adapted to group the local network game terminal and one or more other network game terminal(s) as a user group in order to play out a network game in cooperation between the local network game terminal and other network game terminal(s) using data received from the game server through the first communication control means, means for generating user group data being also adapted to generate user group data, the user group data including group information with which the game server can recognize the grouped network game terminals as one user group, and representative terminal information with which other network game terminal(s) in the user group can recognize the local network game terminal as a representative terminal; and second communication control means which is adapted to send the data received from the game server and the user group data to other network game terminal(s) in the user group.

Furthermore, the present invention provides a game server accessible from a plurality of network game terminals through a predetermined network. The game server has a configuration in which each of the network game terminals comprises: first communication control means for bi-directional communication with the game server over the predetermined network; and means which is adapted to group the local network game terminal and one or more other network game terminal(s) as a user group in order to play out a network game in cooperation between the local network game terminal and other network game terminal(s) using data received from the game server through the first communication control means, the means being also adapted to generate group information with which the game server can recognize the grouped network game terminals as one user group. In this configuration, the game server comprises first recording means on which the group information supplied from the network game terminal(s) are recorded; and means for identifying, in response to a request for logging-in from a network game terminal which is in the user group and is in an offline state, the user group which the requesting network game terminal belongs to, based on the group information and for reading the group information corresponding to the identified user group from the first recording means to send them to the requesting network game terminal.

In this game server, any network game terminal in the user group has logged out and attempts to re-log in the game server can return to the user group which it had belonged to before. Therefore, it is unnecessary to form a party again after a network game terminal has logged out. Re-formation of a party typically requires re-grouping of network game terminals. On the contrary, the game server of the present invention does not require to form a party after a network game terminal has logged out. This means that the frequency of grouping can be decreased.

The status information associated with a user group is recorded on the game server. The game server can provide a returned network game terminal with information about a status of a user group in the game, such as the position of a user group in the game, a representation of a user group in the game (e.g., the name and size of a ship when the user group is visualized as a ship), information about shared items for a user group. If the game has been played out and a status has changed while a re-logging-in network game terminal is in the offline state, the network game terminal after re-login is informed of the changed status of the user group. Therefore, it is possible to provide a game system which enables to play out a game by uses even when one or more network game terminals are in the offline state. A scenario of the game can become more attractive and exciting.

Furthermore, the present invention provides a game server wherein the network game terminal(s) comprise(s) means for sending terminal data to the game server, the terminal data indicating a status associated with the network game terminal(s), the game server comprising: second recording means on which the terminal data supplied from the network game terminal(s) are recorded; when a predetermined event occurs that affects the status associated with the network game terminal(s) in the progress of the network game reflecting the affect of the event to a status associated with a network game terminal in an offline state updating the terminal data recorded on the second recording means.

With this configuration, a status of a network game terminal, such as stamina and possessions of an in-game character corresponding to the network game terminal changes even when the network game terminal is in the offline state. The in-game character is affected by the progress of the game even when the corresponding network game terminal is in the offline state. A scenario of the game can become more attractive and exciting, as compared with conventional network games in which no status changes for an in-game character while the corresponding network game terminal is in the offline state.

As apparent from the above, the present invention makes data transmission more efficient between a server and a plurality of terminals associated with the server. The load on the server can be reduced consequently.

Grouping of the network game terminals (formation of a party in the game) is done less frequently and user groups can be formed promptly. Thus, users can move to the main feature of the game relatively soon after he or she starts the game.

BRIEF DESCRIPTION OF THE DRAWINGS

FIG. 5 is a flow chart showing a series of steps that is performed when the representative terminal is going to either log out or withdraw from the user group which it belongs to;

DETAILED DESCRIPTION OF THE PREFERRED EMBODIMENTS

Figure 1:
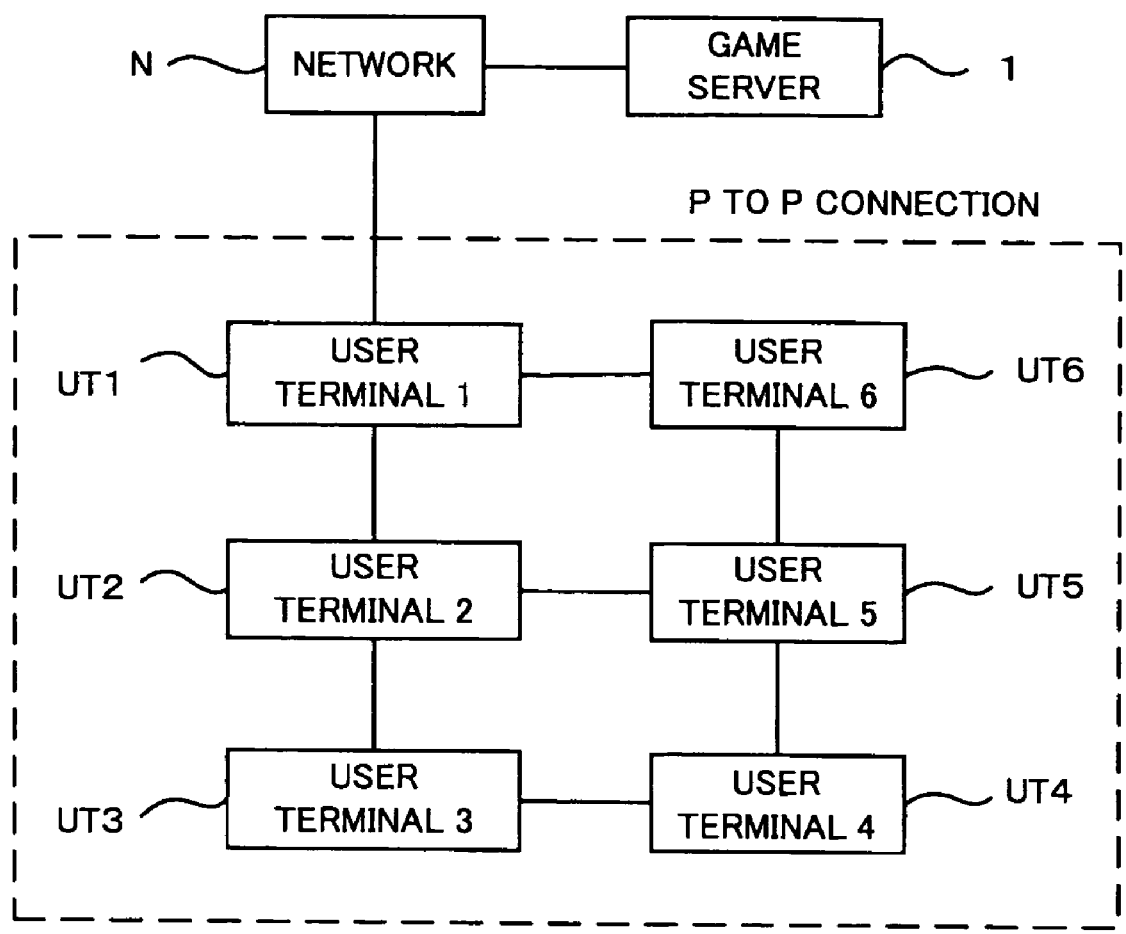
FIG. 1 is a schematic illustration of a game server and a plurality of user terminals in which each user terminal can access directly to any one of other user terminals, peer-to-peer.

In this disclosure, a number of terms are used for which the following definitions are provided. The following definitions are not intended to limit the scope of the present invention, but rather are intended to clarify terms that are well understood by those skilled in the art, and to introduce terms helpful for describing the present invention.

An "online game" as used in the following embodiment refers to massive multi-player online (MMO) games or other type of online role-playing games that are designed so players can build communities inside. By "online game" or merely "game" it is meant that the game is massively multi-player, meaning that hundreds or thousands of people will be accessed to the same gaming world simultaneously.

A "game server" as used herein refers to a computer that allows people to play online games. The game server is sometimes referred to herein merely as "server", and both terms are used interchangeably.

A "user terminal" as used herein refers to a computer or any other devices on which a method according to the present invention can be implemented. The user terminal has access to the game server through a network, such as the Internet. In general, hundreds or thousands of user terminals are accessed to a single game server. Examples of the user terminal include, but not limited to, a personal computer (PC), a cellular phone, and a dedicated gaming machine or console. In addition, the user terminal may be part of a computer system.

A "user" as used herein refers to a person (player) who uses a user terminal and plays online games on his or her user terminal. The terms "user" and "player" are used interchangeably.

A "character" as used herein refers to a fictional identity in a game that represents a player of the game. Each player chooses a character before he or she joins in the game. The character takes the place of the actual player in the game.

A "party" as used herein refers to a team of characters who group together. A party is formed in order to achieve a common purpose in the game.

A "user group" as used herein refers to a conceptual group of user terminals. When a party is formed by characters, user terminals corresponding to these characters are considered as one user group. In the disclosure herein, the number of user terminals in one user group is not specifically limited. A single user terminal that does not belong to any group of user terminals is also considered as a "user group".

A "representative terminal" herein means a user terminal that represents a user group. The representative terminal "bridges" a game server and the remaining user terminals in the same user group as the representative terminal from the viewpoint of data exchange. Any user terminal in a user group would be a potential representative terminal depending upon conditions of the game as described below. When one user terminal is the sole member of the user group, this user terminal serves as a representative terminal.

The term "in the online state" when used in reference to a user terminal, means that a user of a user terminal has logged in a game. Likewise, the term "in the offline state" when used in reference to a user terminal, means that a user of a user terminal has logged out a game.

FIG. 1 shows a gaming system as an example of a system in which a server is connected to a plurality of user terminals through a network. For the purpose of this disclosure, it assumes that user terminals (network game terminals) UT1 to UT6 constitute a user group and that the user terminal UT1 serves as a representative terminal. It also assumes that each player uses one user terminal and plays the game with one character. However, this specific configuration is not intended to limit the scope of the present invention.

In FIG. 1, a game server 1 is connected to the user terminal UT1 through a network N such as the Internet, and the user terminal UT1 is connected to other user terminals UT2 to UT6 in a peer-to-peer fashion. It should be noted that FIG. 1 shows a logical connection between the game server 1 and the individual user terminals UT1 to UT6. The game server 1 and the user terminals UT1 to UT6 are each physically connected to the network N. The user terminals UT1 to UT6 are logically connected to each other in a peer-to-peer fashion. More specifically, each user terminal is provided with addresses of other user terminals in the same user group, so that each user terminal can access directly to any one of other user terminals, peer-to-peer. This example shows a case where a user group has six user terminals UT1 to UT6. However, there is no limitation on the number of user terminals included in a user group. Depending on a choice of each player or scenario of a game, the user group may include at least one user terminal. If the user group includes two or more user terminals, these user terminals can access directly to each other in a peer-to-peer fashion.

As described above, the user terminal UT1 serves as a representative terminal to exchange information with the game server 1. The game server 1 supplies, to the representative terminal, the data necessary to play out a game on the user terminals UT1 to UT6 (hereinafter, referred to as "distributed game data"). The distributed game data may be, for example, data relating to the position of a user group, backgrounds, and the weather in the game, as well as graphic data associated with them. The user terminal (representative terminal) UT1 receives the distributed game data and plays out the game on the local terminal. The user terminal UT1 sends at least a part of the distributed game data to other user terminals UT2 to UT6 within the same user group. Thus, the distributed game data that are supplied to the user terminal (representative terminal) UT1 are those from the game server 1, while the user terminals (members of the same user group as the user terminal UT1) UT2 to UT6 receive at least a part of the distributed game data from the representative terminal UT1.

The distributed game data are, as described above, supplied from the game server 1 to the representative terminal. Examples of the distributed game data include, but not limited to, graphic data for animated and still images of a game to be displayed on the user terminals UT1 to UT6, data relating to the weather in the game, map data indicating the position of an island, and data relating to a marine chart in the game. According to the present invention, an online game gets underway by the cooperation of the representative terminal and other user terminals within the same user group using the data (the distributed game data in this embodiment) that the representative terminal has received from the game server. In such a case, at least a part of the distributed game data is equally required for all user terminals in the same user group. For example, characters exploring the game world in a party may be in the same situation or see similar sights. Thus, all user terminals in one user group equally need some common graphics and information. This embodiment assumes that characters corresponding to the user terminals UT1 to UT6 sail the seas on the same ship. All user terminals UT1 to UT6 need the graphics relating to the ship and map data around the ship. Alternatively, when two-dimensional images taken from the perspective of each character are displayed on a display screen which is connected to the corresponding user terminal on the basis of three-dimensional graphic data obtained from the game server, the display screens have different images from each other. However, in such a case, the three-graphic data for the ship and around the ship, which are necessary for the production of these two-dimensional images on the display screens from the perspective of each character, are shared for these user terminals involved.

As apparent from the above, in this embodiment, distributed game data at least part of which is equally required for all involved user terminals, such as graphic data, are sent from the game server to the representative terminal in the user group, and each user terminal is supplied with at least a part of the distributed game data from the representative terminal. The game server is required to send a smaller amount of data to the user group as compared with the case based on the conventional technique where the game server should send the distributed game data to all user terminals in the user group. Consequently, the load on the server can effectively be reduced.

The representative terminal UT1 also has a function to send user group data to the game server 1. The user group data indicate information about the associated user group. The user group data comprise terminal data relating to the individual user terminals and group-shared data shared by the user terminals in the associated user group.

More specifically, the terminal data represent, for example, connection status (online or offline) of the user terminals and basic information associated with a game. Such basic information includes, but not limited to, information about a character (corresponding to the user terminal) in the game, information about the position (coordinates), stamina and possessions of the character, and information about a game status.

Examples of the terminal data used in this embodiment are given in the table below.

| status | coordinates | maximum stamina | current stamina | possessions |
|---|---|---|---|---|
| online | 1122, 0943 | 992 | 619 | club, cloth garments, portions |

On the other hand, the group-shared data are exchanged among the user terminals in the same user group. The group-shared data include group information with which the game server 1 can recognize a user group. In other words, the game server 1 can consider a group of user terminals including the representative terminal as a user group, based on the content of the group information. The group-shared data include a user group ID (GID) and name of the user terminal or terminals (including the representative terminal) belonging to a single user group. In this embodiment, the user group ID and terminal name(s) are used as the group information to identify the grouped user terminals and the user group with the ID. The game server 1 can utilize this group information to acknowledge the grouped user terminals as a single user group.

The group-shared data include, as representative terminal information, the name of the user terminal that currently works as the representative terminal. All user terminals other than the representative terminal can recognize the representative terminal according to the name of the representative user terminal. In other words, the representative terminal adds the local terminal name to the group-shared data to allow other user terminals in the same user group to recognize the local terminal as the representative terminal.

As information representing a status of the user group, the group-shared data in this embodiment include, for example, the name and position of the user group in the game, items, user link information (e.g., IP information such as an IP address) in the user group. The user group in the game in this embodiment is represented as a ship and the name of the user group in the game is a ship name corresponding to the subject user group.

In addition, the group-shared data also include the names of the user terminals (represented as terminals in the table) including the representative terminal in the user group, the name of the representative terminal, IP addresses of the individual user terminals, items on the ship, the scale of the ship, position information such as coordinates of the ship in the game, a user terminal or terminals in the online state, (On terminal), a user terminal or terminals in the offline state (Off terminal). As an example, some of the group-shared data are given in the table below for the case where a user group consists of four user terminals T1, T2, T3, and T4 in this embodiment.

UT1 to UT6. Instead, the game server 1 receives user group data only from the representative terminal which is one of the user terminals UT1 to UT6.

This configuration reduces the load on the server as compared with a case where data are exchanged between the game server and individual user terminals.

In this embodiment, when a user begins a game for the first time, the user either adds his or her user terminal to an existing user group or makes his or her user terminal as a "user group having only one user terminal" before joining in the game. The size of the user group thus varies from time to time by admission of a new user terminal or by withdrawal of one or more existing user terminals.

When a new user group is created, the user terminal which serves as the representative terminal for this new user group generates user group data including terminal data and group-shared data. The representative terminal records the user group data on the data recording unit therein. In addition, the representative terminal sends the user group data to the game server 1 and receives the distributed game data from the game server 1. The user terminal which serves as the representative terminal plays out the game based on the distributed game data received from the game server 1. On the other hand, one or more user terminals which are not the representative terminal play out the game based on the user group data and the distributed game data obtained through the representative terminal.

The game server 1 and the user terminals UT1 to UT6 may be configured in the following manner.

<Game Server>

The game server 1 exchanges data with the representative terminal which is one of the user terminals UT1 to UT6.

| GID | ship name | terminals | representative terminal | shared item(s) | ship scale | coordinates | On terminals | Off terminals |
|---|---|---|---|---|---|---|---|---|
| 0012 | aten | T1, T2, T3, T4 | T1 | prism | for 10 persons | 1123, 0942 | T1, T2 | T3, T4 |

The distributed game data are supplied from the game server 1 and are necessary to play out the game on the user terminals UT1 to UT6. The user group data, on the other hand, are necessary for management by the game server 1 of a scenario of the game played out on the user terminals UT1 to UT6.

In the system shown in FIG. 1, the distributed game data are supplied from the game server 1 to the representative terminal through the network N. The user terminals UT1 to UT6 can access directly to each other in a peer-to-peer fashion. The distributed game data received as described above are transmitted within the user group. In this embodiment, the distributed game data are transmitted to the representative terminal and are recorded on a data recording unit (data recording unit 32 in FIG. 4 described below) in the representative terminal. Other user terminals obtain the distributed game data through peer-to-peer connections.

Thus, the game server 1 is not required to send data to each of the user terminals UT1 to UT6. Instead, the game server 1 sends data only to the representative terminal which is one of the user terminals UT1 to UT6. Likewise, the game server 1 is not required to receive data from each of the user terminals Specifically, the game server 1 sends data that are necessary to play out a game on the user terminals UT1 to UT6. The game server 1 may be implemented by a computer having a central processing unit (CPU), a communication mechanism, a random access memory (RAM), a read-only memory (ROM), and a storage device. The CPU loads and executes a predetermined computer program and data to generate a functional block and a data file which are used for achieving below-described processing operations to be carried out by the game server 1.

The computer program and data are either stored on a CPU-readable storage device or distributed over the network N. The communication mechanism is a well-known mechanism that is used to transmit and receive information to and from the above-mentioned representative terminal through the network N. The RAM is for temporarily storing data produced during various game operations. The RAM also temporarily stores information received from the representative terminal through the communication mechanism. The ROM has a basic computer program and data stored thereon which are necessary for the operation of the game server 1. The storage device is a so-called hard disk device having a magnetic recording medium therein. An operating system, an application program, and a large volume of data are stored on this storage device.

Figure 2:
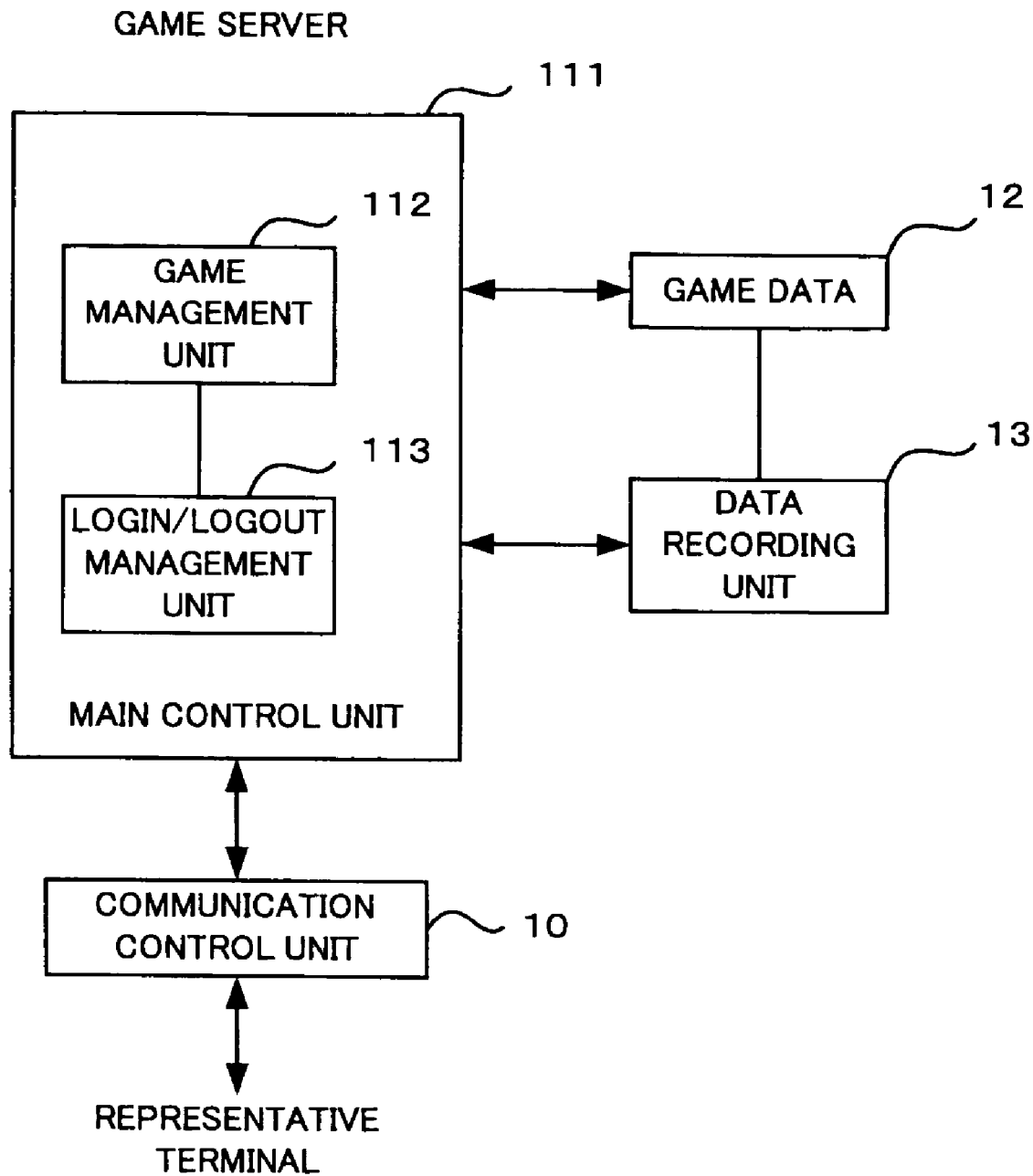
FIG. 2 shows a functional configuration of a game server.

FIG. 2 shows a functional configuration provided by the CPU. As shown in the figure, the game server 1 comprises, besides a communication control unit and a main control unit 111, a game data 12 and a data recording unit 13. The main control unit 111 comprises a game management unit 112 and a login/logout management unit 113. The communication control unit 10 exchanges data with the representative terminal.

Figure 3:
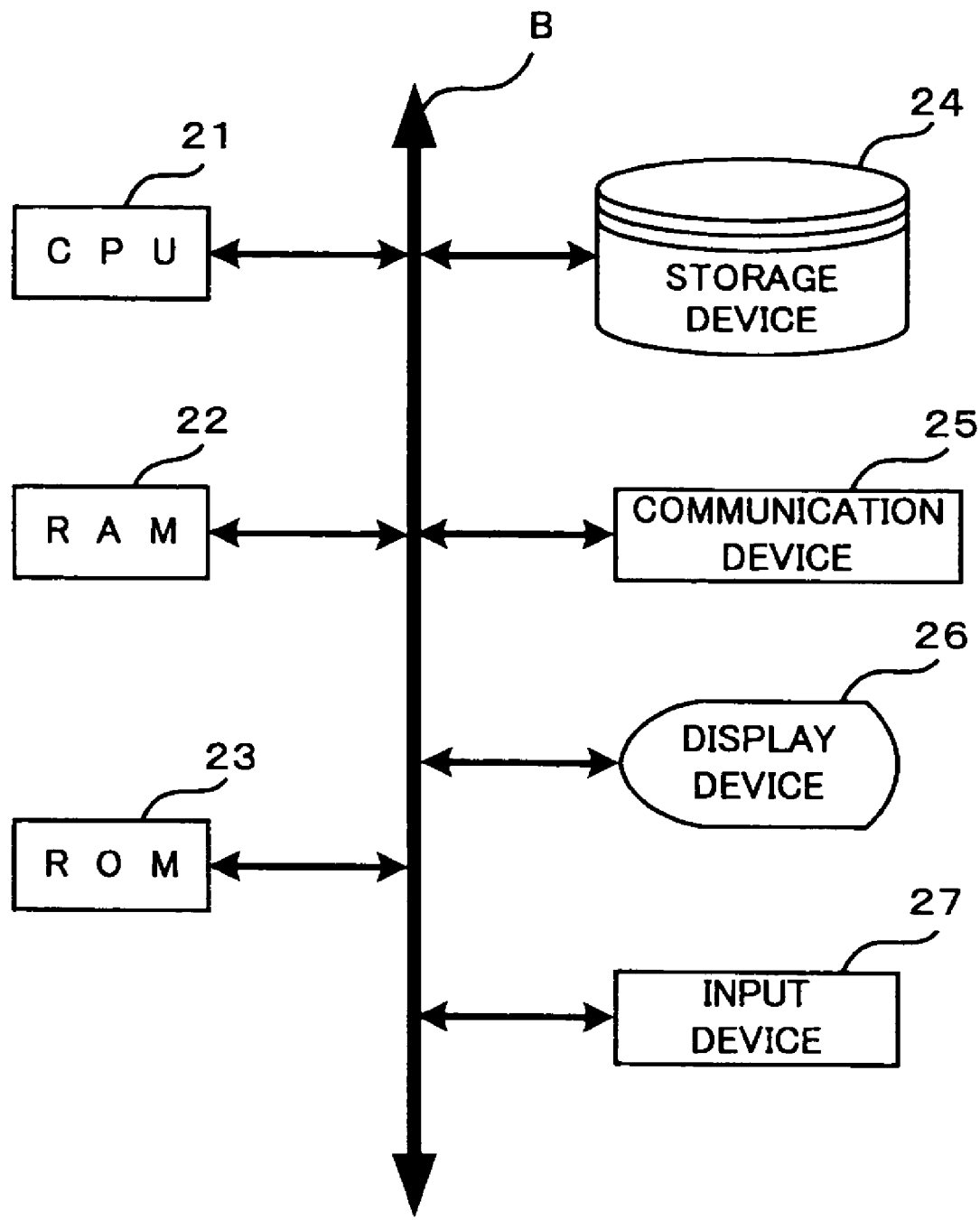
FIG. 3 shows a hardware configuration of a game server.

FIG. 3 shows a hardware configuration of the game server 1. The game server 1 comprises a CPU 21 which is a main processor, a RAM 22 which serves as a main memory for the CPU 21, and a ROM 23 on which control programs and other programs are stored. The CPU 21, the RAM 22, and the ROM 23 are connected to each other through a bus B. The bus B is also connected to a storage device 24 such as a hard disk, a communication device 25 for bi-directional communication with the game server 1 through the network N and bi-directional communication with other user terminals in the same user group, a display device 26 and an input device 27 through respective interface mechanisms (not shown). The display device 26 and the input device 27 are used by an administrator of the game server 1.

In FIG. 2, the game management unit 112 manages the progress of the game on the user terminals associated with the game server 1. For example, the game management unit 112 creates an event such as a battle or discovery of an item, and performs a processing such as graphic production of an ordinary screen or an event screen. The login/logout management unit 113 monitors login/logout of the representative terminal to the game server 1. In response to a request for logging out the representative terminal, the login/logout management unit 113 performs an operation to allow the representative terminal to log out, operation for transferring the representative right of the representative terminal to one of other terminals in the same user group, or an operation associated with abnormal disconnection of the representative terminal.

The game data 12 include graphic data used for producing game screens. The game data 12 also include other data to be required for a scenario of the game, such as data associated with event conditions and items to be appeared in the game.

The data recording unit 13 records the user group data that the game server 1 has received through the representative terminal. As described above, the user group data are information relating to the user group itself and information about the user terminals in the user group. In general, the user group data are updated by updating data from the representative terminal. However, they may be updated by the game management unit 112.

In this embodiment, the communication control unit 10 and the main control unit 111 in FIG. 2 are implemented by the CPU 21 in FIG. 3 with software on the RAM 22 and/or the storage device 24. The data recording unit 13 in FIG. 2 is composed of a predetermined recording area in the storage device 24. The game data 12 in FIG. 2 are stored in the ROM 23. The ROM 23 may be any one of suitable recording means such as CD-ROMs and DVD-ROMs. The game data 12 may be stored on the storage device 24 to eliminate the necessity of the ROM 23.

<User Terminal>

User terminals in this embodiment constitute a user group. Each user terminal can access directly to any one of other user terminals in the same user group, peer-to-peer. A user terminal which serves as the representative terminal for its user group can access to the game server 1 in addition to peer-to-peer communications with other user terminals.

Each of these user terminals may be implemented by a computer having a CPU, a communication mechanism, a RAM, a ROM, and a storage device, as in the case of the game server 1. The CPU in each user terminal loads and executes a predetermined computer program and data to generate a functional block and a data file which are used for achieving below-described processing operations to be carried out by the local user terminal.

The computer program and data are either stored in a CPU-readable storage device or distributed over the network N. The communication mechanism is a well-known mechanism that is used to transmit and receive information to and from the game server 1 and other user terminals through the network N. The RAM is for temporarily storing data produced during various game operations and actions. The RAM also temporarily stores information received from the game server 1 or other user terminals through the communication mechanism. The ROM has a basic computer program and data stored thereon which are necessary for the operation of the local user terminal. The storage device is a so-called hard disk having a magnetic recording medium therein. An operating system, an application program, and a large volume of data are stored on this storage device.

Figure 4:
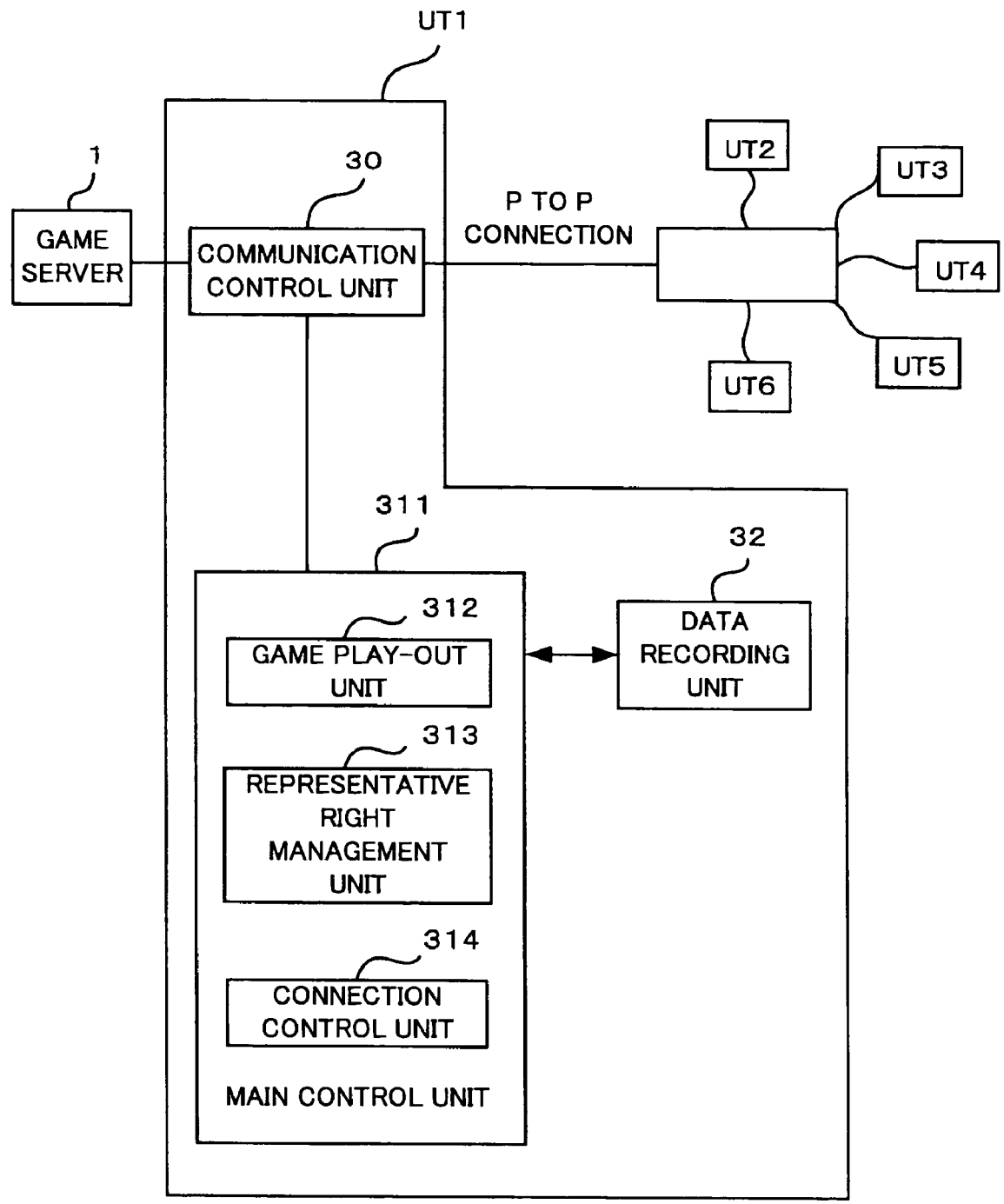
FIG. 4 shows a functional configuration of a user terminal.

As an example of the user group, FIG. 4 shows a connection between a game server and a user group consisting of the user terminals UT1 to UT6.

In this example, the user terminal UT1 serves as the representative terminal. However, FIG. 4 merely shows a functional configuration provided by the CPU in each user terminal for convenience and simplicity. The positioning of the user terminals, i.e., representative or not, in the user group is a relative issue and is determined dynamically depending on various factors, such as the number of user terminals included in the user group, the number of the user terminals in the online state, and some other factors. Although this example represents a case where the user group has six terminals, there is no limitation on the number of user terminals consisting of the user group. In addition, a user group having only one terminal is also considered as the user group in this embodiment. Such a user group with one user terminal automatically designates the only user terminal as the representative terminal.

A hardware configuration shown in FIG. 3 is necessary in order to implement the communication control unit 30 and other components in the user terminal shown in FIG. 4, as in the case of the game server shown in FIG. 2. More specifically, the communication control unit 30, a main control unit 311, a game play-out unit 312, a representative right management unit 313, and a connection control unit 314 shown in FIG. 4 are implemented by software-based means on the RAM 22 and/or the storage device 24 when the CPU 21 in FIG. 3 loads a program for the user terminal from the ROM 23 and execute this program. The data recording unit 32 is composed of a predetermined recording area in the storage device 24.

As shown in the figure, each user terminal comprises the communication control unit 30, the main control unit 311 and the data recording unit 32. The communication control unit 30 controls bi-directional communication between the game server 1 and the user terminals on the network N. The communication control unit 30 also controls bi-directional peer-to-peer communication among the user terminals.

The main control unit 311 comprises the game play-out unit 312, the representative right management unit 313 and the connection control unit 314. In this embodiment, the game play-out unit 312, the representative right management unit 313 and the connection control unit 314 are established by software. However, they may be implemented by hardware means.

The game play-out unit 312 controls the progress of the game on the local user terminal. The game play-out unit 312 plays out the game on the local user terminal according to the scenario using the distributed game data supplied from the game server 1. In addition, the game play-out unit 312 produces game screens to the user on a display provided in the local user terminal.

The main control unit 311 exchanges necessary data with other user terminal or terminals forming the same user group, in a peer-to-peer fashion through the communication control unit 30. For example, when a stamina value or a possession changes with a certain action by the character in the game that the user of one user terminal manipulates, this user terminal sends the information which indicates this change to other user terminals, peer-to-peer. Likewise, it receives appropriate information from other user terminals in the same user group.

When the user terminal UT1 serves as the representative terminal, the main control unit 311 receives the distributed game data from the game server 1, and sends these data to other user terminals UT2 to UT6 in a peer-to-peer fashion. The main control unit 311 according to this embodiment records the received distributed game data on the data recording unit 32 and then transmits in a peer-to-peer fashion the distributed game data in response to a request from other user terminals UT2 to UT6. The representative terminal records the user group data on the data recording unit 32.

The representative right management unit 313 manages the representative right given for one user terminal in the user group. For example, the representative right management unit 313 plays a mediation role among the user terminals as to which user terminal fills the representative terminal. The representative right management unit 313 also has a function to transfer the representative right when the local user terminal is working as the representative terminal and it is going to log out to exit the game.

The connection control unit 314 communicates with other user terminal or terminals in the same user group in a peer-to-peer manner through the communication control unit 30 when the local user terminal is not the representative terminal. It communicates with the game server 1 through the communication control unit 30 in addition to the peer-to-peer communication just mentioned, when the local user terminal is the representative terminal.

Each user terminal can determine whether the local user terminal is the representative terminal or not according to the above-mentioned group information. Various operations which are performed none of the above-mentioned game play-out unit 312, representative right management unit 313, and connection control unit 314 are carried out by the main control unit 311 when necessary. Examples of such operations include, but not limited to, an operation to determine whether the local user terminal is the representative terminal and an operation to write the user group data into the data recording unit 32.

As described above, the main control unit 311 in the user terminal UT1 which serves as the representative terminal generates the user group data including the terminal data and the group-shared data when the user group is created first. These generated data are recorded on the data recording unit 32, and then the distributed game data are received from the game server 1. In addition, in the representative user terminal UT1, the game play-out unit 312 plays out the game based on the distributed game data received from the game server 1, the program read out of the ROM 23, and the user group data recorded on the data recording unit 32. In the user terminals UT2 to UT6 other than the representative terminal, the game is conducted based on the distributed game data obtained through the representative terminal, as well as the programs read out of the RAM 22, the ROM 23, and the storage device 24 in the subject user terminal.

Next, description is made about an operation/management of an online game system to which the data transfer technique of the present invention is applied.

<User Group>

The user group in this embodiment is essentially formed of a plurality of user terminals. Each character takes the place of the actual player in the game on his or her own user terminal. In this game, the user group is represented as one group of characters played by the users associated with one user group. In general, such a single group of characters is called a "party".

Each user plays his or her character in the game. Each character (of one user) cooperates with other character or characters (of other user(s)) in the same party in order to achieve a certain purpose in the game. A user group is represented as, in the game herein, a gathering of characters corresponding one by one to the user terminals included in the user group. For example, the user group may be represented in the game as a "vehicle on which characters grouped as a party ride". The characters may be represented as "crews of the vehicle". In this embodiment, the user group is visualized either as a ship or as a boat in the game and each character is represented as a crew of a ship or an owner of a boat.

After a user has logged in, his or her character is considered "active" in the game, that is, the crew played by the user is waking and can act freely. When the user exits the game while the character is included in a party (i.e., the corresponding user terminal is in a user group), the character played by this user is considered to be "rest" in the game. In this embodiment, the character is kept sleeping in a bed in the ship on which the character rides. As apparent from the above, even after the user has logged out, his or her user terminal is still in the user group where it is at the time of logout. This is quite in contrast to conventional online games of this type. Thus, even when a user exits the game, the representative terminal of the associated user group does not remove information relating to the user terminal of the logged-out user (e.g., ID of this user terminal) from the user group data.

Any characters in the game that correspond to user terminals in the offline state are simply considered to be asleep. Users of the user terminals in the online state play out the game regardless of whether one or more user terminals have logged out. When a user terminal in the offline state has logged in again, the character associated with this user terminal awakes and acts freely. Conventional online games do not allow any character to return to the group (party) that it had belonged to once the user who plays this character has logged out. Instead, the character should either move independently or form a new party. Continuity of the game cannot be maintained accordingly. In addition, in order to form a new party with those who will cooperate with the comeback character in conventional online games, the character is typically required to recruit or gather around other characters to form a party in, for example, a virtual lobby in the game. After formation of a party, the main feature of the game follows. Thus, online games of this type suffer problems that "no user can move to the main feature of the game before making up the necessary number of the members for the party and a gaming process is interrupted by this time-consuming process of collecting the members." On the contrary, this embodiment allows each character (each user terminal) to return to the original party (original user group) which it had belong to before the last logout. Therefore, continuity of the game can be maintained. This also solves the problem of time waste for collecting party members.

When a user plays a certain game for the first time, his or her character may join in an existing party. Alternatively, the character may recruit or gather around other character or characters with whom he or she forms a party. When a party is formed, recruiting or gathering around of other character or characters may be done in a virtual lobby which is provided besides the main feature of the game, as in conventional cases.

However, in this embodiment, a user is allowed to run directly to the main feature of the game by means of dealing his or her user terminal as a "new user group having only one user terminal", rather than making his or her character to recruit members in a virtual lobby which is provided besides the main feature in typical conventional MMO games. This operation is described below in the section entitled "User Access and Login". In this embodiment, a "get-together place" is provided in the main feature of the game for a lone character who wants to join in another party or a character who wants to supplement a member to his or her party. This facilitates each character to join in another party or to plug his or her party.

<Withdrawal from User Group and Transfer of Representative Right>

Next, an operation is described that is to be performed when a user terminal leaves from the user group mentioned above.

A user terminal may leave from the user group either (1) when the user who operates the user terminal voluntarily leaves from the current user group or (2) when the user terminal is involuntarily (compulsorily) withdrawn from the user group. The former case applies when the user wants to withdraw his or her user terminal from the current user group to allow his or her character to act independently, or when the user wants to move his or her character from one party to another party.

As described above, the user group in this embodiment is represented as a ship which the characters ride on. Thus, the main control unit 111 of the game server 1 determines the coordinates of the in-game ship corresponding to the user group and the coordinates of the in-game character corresponding to the user terminal. The main control unit 111 compares these two sets of coordinates with each other. When the difference between the two sets of coordinates exceeds a predetermined value, this indicates that the distance between the ship and the character exceeds a predetermined value. In such a case, the main control unit 111 disembarks or removes the subject character from the ship which the character has ridden on. The above-mentioned determination and comparison of the coordinates as well as withdrawal of the character may be performed by the main control unit 311 in the representative terminal.

In this embodiment, each character is provided with a boat and the character who is going to leave from the ship uses his or her own boat, regardless of whether the withdrawal is voluntarily or compulsorily. Any character who is on his or her boat indicates that the user terminal corresponding to the character has withdrawn from the user group. After that, the character may either act alone or join in another party. This means that the user terminal after withdrawal may either be kept independent or moved to another user group.

Exact operations to withdraw a user terminal from the user group which it belongs to depend on whether the leaving user terminal is serving as the representative terminal or not. Unlike other user terminals, the representative terminal has a role to exchange data with the game server 1 on behalf of the user group which it belongs to. Different withdrawal procedures are thus necessary for a representative terminal and for a non-representative terminal.

When the user terminal leaving from the user group is not the representative terminal (here, the user terminal UT6 is assumed to be the leaving terminal), a request for withdrawal is supplied from the user terminal UT6 to the representative terminal. The representative terminal deletes the terminal data of the user terminal UT6 from the group-shared data. Other user terminals (i.e., the user terminals except for the leaving user terminal UT6 and the representative terminal UT1) periodically access to the representative terminal to obtain the user group data (including the group-shared data). Other user terminals "find out" that the information about the user terminal UT6 is deleted from the group-shared data, at the time when they receive the user group data (including the group-shared data) without the information about the user terminal UT6. Then, the peer-to-peer connection between the user terminal UT6 and the remaining five user terminals is terminated.

On the other hand, when the representative terminal is going to withdraw from the current user group, it is necessary to transfer the representative right first to one of other user terminals within the same user group, provided that the user group includes one or more user terminals in the online state. The user terminal which takes the representative right will serve as a new representative terminal. When all user terminals other than the leaving user terminal in the same user group are in the offline state, the representative right is virtually "deposited" to the game server rather than being transferred to other user terminal.

Transfer of the representative right also occurs when the user of the representative terminal may be going to log out to exit the game. Logout itself does not result in withdrawal of the user terminal from the user group but the fact remains that the user terminal will become unavailable as the representative terminal. Therefore, the representative right of the representative terminal is transferred to one of other user terminals within the same user group, again provided that the user group includes one or more user terminals in the online state. When the representative terminal that is going to log out is the only member of the user group, the representative right is virtually "deposited" to the game server rather than being transferred to other user terminal.

Figure 5:
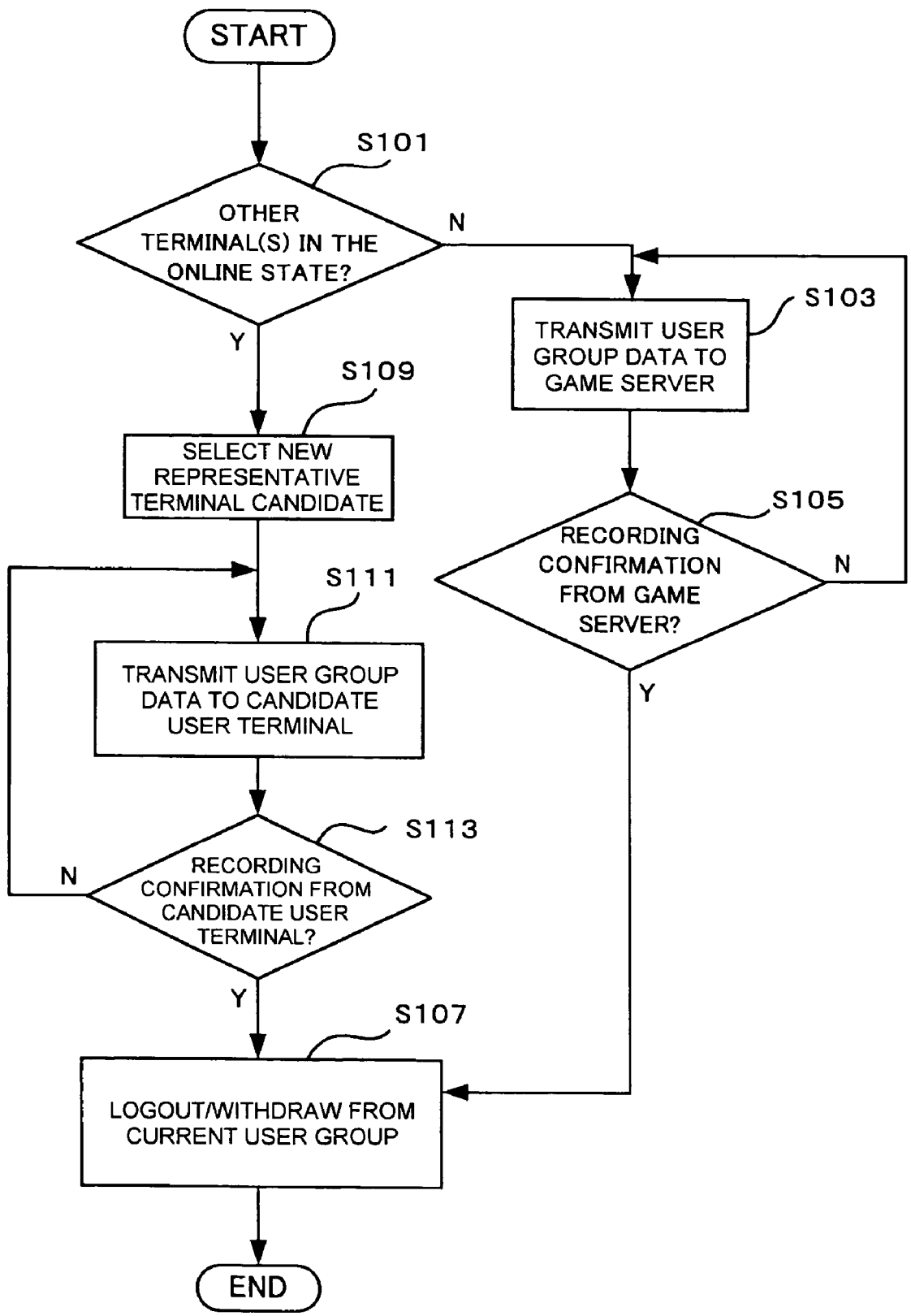

FIG. 5 is a flow chart that is performed when the representative terminal is going to either log out or withdraw from the user group which it belongs to. The representative terminal may (1) become independent, (2) move into a separate user group by withdrawing the user group which it belongs to, or (3) be logged out in mid-flow of the game. In such a case, the representative right of the representative terminal may be transferred to another user terminal or may be "deposited" to the game server. To this end, the representative right management unit 313 of the representative terminal UT1 determines whether one or more user terminals in the same user group are in the online state (S101). When no other user terminal in the user group is in the online state or when the representative terminal is the only member of the user group (S101: N), the representative right management unit 313 transmits the user group data to the game server 1 (S103). Logout or withdrawal from the user group may be done at the time of completion of this transmission. However, in this embodiment, it is determined whether a confirmation is returned from the game server 1 to indicate that the user group data have been recorded on the data recording unit 13 in the game server 1. When no confirmation is returned (S105: N), the step S103 is again performed to transmit the user group data. When confirmed (S105:Y), logout or withdrawal from the user group is done (S107).

When one or more other user terminals are in the online state (S101:Y), the representative terminal UT1 first removes information about the local user terminal from the group-shared data in the user group data. The user terminal UT1 chooses a candidate of a new representative terminal from the user terminals in the online state, and then sends a request for transfer to the candidate user terminal (S109) to which the user terminal UT1 wants to transfer its representative right. After the candidate user terminal accepts the request for transfer, the user group data recorded on the data recording unit 32 of the current representative terminal is sent to the candidate user terminal which accepts the request (S111). Withdrawal of the representative terminal from the user group or logout of it may be done at the time of completion of this transmission. However, in this embodiment, it is determined whether a confirmation is returned from the candidate representative terminal to indicate that the user group data have been recorded on the data recording unit 32 of the candidate representative terminal. When no confirmation is returned (S113: N), the step S111 is again processed to transmit the user group data. When confirmed (S113: Y), logout or withdrawal from the user group is done (S107). The candidate user terminal adds, as described above, the local terminal name to the group-shared data (not shown in FIG. 5) to complete the transfer of the representative right. After the addition of the name of the candidate user terminal to the group-shared data, this user terminal starts to work as the representative terminal.

For the purpose of determining a candidate representative terminal in the above mentioned step S109, order of priority in dealing with the user terminals is previously established. For example, the current user terminal determines which user terminal takes the position of the new representative terminal according to a predetermined rule. Such a rule may be, for example, "the user terminal of which total play period is shortest is assigned as the representative terminal", "the user terminal which suffered from disconnection failure in a shortest period of time is assigned as the representative terminal", or "the user terminal that joined the user group most recently is assigned as the representative terminal". In this embodiment, the user terminal of which total play period is shortest is chosen as a candidate representative terminal.

As described above, the representative terminal is selected from the user terminals in the online state in the user group. When only one user terminal other than the representative terminal UT1 is in the online state, that user terminal is automatically selected as the candidate representative terminal. When all user terminals other than the representative terminal UT1 are in the offline state, the user group data recorded on the representative terminal are sent to the game server 1 and are recorded on the data recording unit 13 in the game server 1.

In case of abnormal disconnection (e.g., accidental line disconnection), the representative terminal transmits the user group data to the game server 1 at a predetermined timing such as occurrence of a certain event. In addition, the representative terminal periodically transmits the user group data to the game server 1 in order to avoid a situation where the user group data sent to the game server 1 are not updated for a long period of time. The game server 1 records the user group data on the data recording unit 13 thereof. Thus, even if abnormal disconnection occurs due to, for example, an accident in the representative terminal, the user group data recorded on the game server 1 are read to select a representative terminal again for keeping the continuity of the game. A signal indicating that something abnormal has occurred may be transmitted to the game server 1 when a user terminal cannot access to the representative terminal.

The game server 1 records the user group data in response to transmittance of the user group data from the representative terminal in the above-mentioned step S103. In this embodiment, the user group data include information about the number of user terminal(s) in the online state. With this, the game server 1 can determine whether a user group includes a user terminal in the online state. In addition, game server 1 provides some events that affect a user group some of which user terminals are in the online state, a user group having no user terminal in the online state, a user character belonging to that user group, as well as a user group (in-game ship) all of which user terminals are in the online state. For example, when a storm occurs as a result of an event in the game, the durability of the in-game ship corresponding to the user group may decrease for the user group all or some of which user terminals are in the offline. All or a part of fixings of the ship may be lost for this user group. Characters in this user group may loose his or her stamina, or accessories thereof may be lost. In such a case, the user group data for this user group is updated. More specifically, data relating to the items affected by this event are rewritten. Such items include, for example, the durability and fixings of the ship, and stamina and accessories of the characters. Thus, the effect of this event can be reflected to the game.

Stamina and accessories do not change for the characters and the party of the characters that are not in the online state in conventional massive multi-player online games. In other words, the status at the time of last logout is maintained for each character in the game. However, in this embodiment, the status may be varied for characters corresponding to the user terminals that are in the offline state as well as those in the online state. Furthermore, even when all user terminals in the user group are in the offline state, the status of the characters played by the users of the associated user terminals may be varied. Therefore, the present invention can provide thrills in the game as compared with the above-mentioned conventional massive multi-player online games. When one character has logged out, other character or characters whose user terminal is in the online state can steer the in-game ship to move to somewhere else, or can wage a fight. This means that the game may be played out by "waking" characters even when one or more characters are "sleeping". A user who can take time to log in the game only for a short period of time may ask for other users to play out the game in place of him or her. In other words, even a user who cannot take enough time for a game may achieve an event that requires a long-time involvement in the game for completion.

<User Access and Login>

Figure 6:
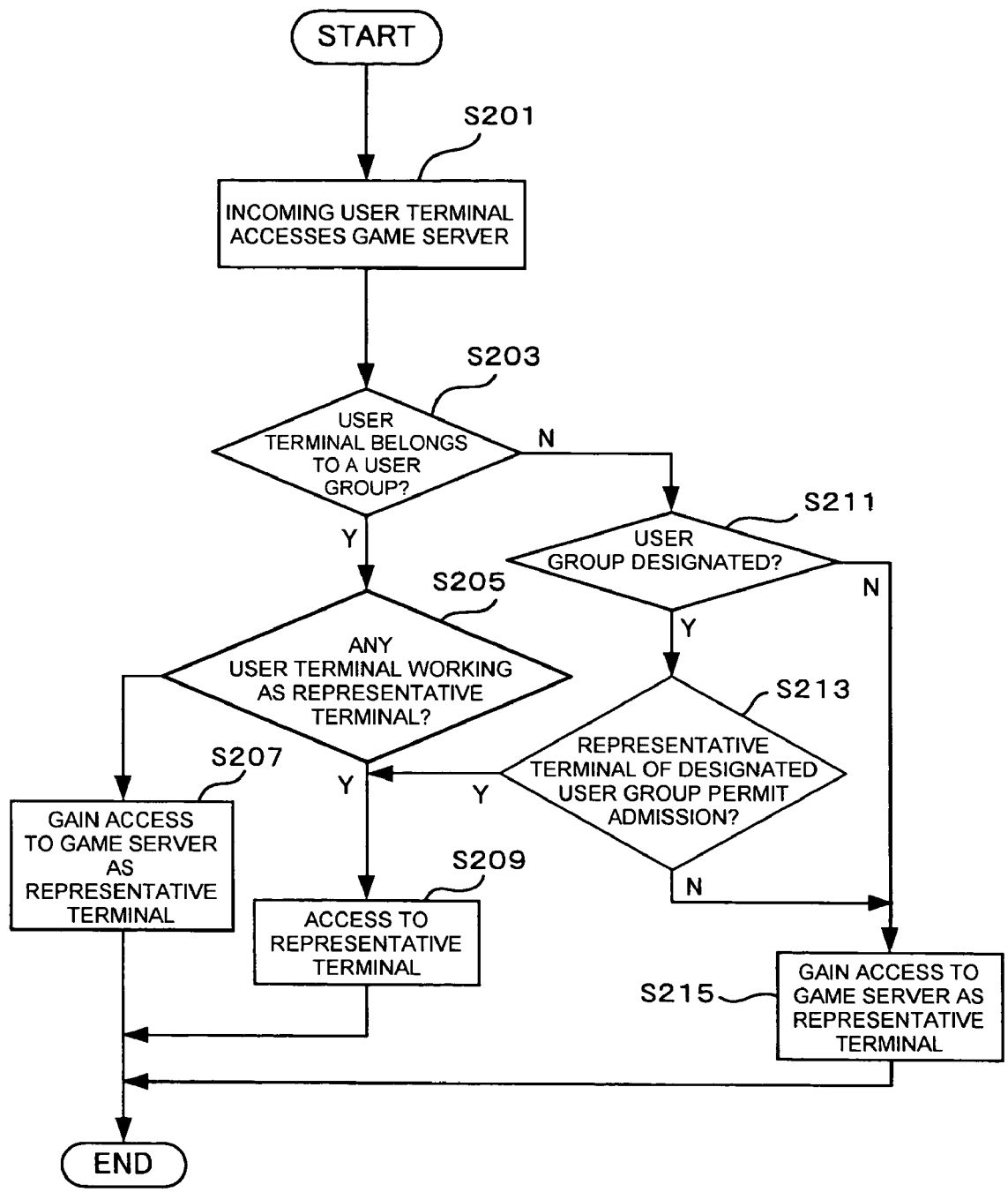
FIG. 6 is a flow chart of an operation which is performed when a user terminal has accessed a game server.

FIG. 6 is a flow chart of an operation which is performed in this system when a user terminal has accessed the game server 1 to log in a game. This incoming user terminal accesses the game server 1 through the network N (S201). "Incoming," when used in reference to a user terminal, means that a user of this user terminal plays, for the first time, the game provided by the game server 1 or that he or she has logged in the game again after a certain interruption. The login/logout management unit 113 of the game server 1 accesses the data recording unit 13 and searches information about the user group which the incoming user terminal belongs to (S203). Thus, the login/ logout management unit 113 determines whether the incoming user terminal is a "new" user terminal or it is a "returned" user terminal after a certain interruption.

This operation may be done by any one of known techniques. In this example, ID which is assigned to the incoming user terminal is checked out against the ID included in the user group data stored on the data recording unit 13. When it is found that the incoming user terminal is a returned user terminal that belongs to a certain user group (S203: Y), it is determined whether the user group specified by the user group data includes a user terminal that is working as the representative terminal at that time (S205). When no terminal is working as the representative terminal (i.e., when all user terminals in the user group are in the offline state) (S205: N), the incoming user terminal gains access to the game server 1 as the representative terminal (S207). When a user terminal is working as the representative terminal (S205: Y), the incoming user terminal is allowed to access to the representative terminal, peer-to-peer (S209).

When the step S203 indicates that the incoming user terminal does not belong to a user group, it is determined whether the user of the incoming user terminal designates a user group which he/she wants his/her user terminal to be joined in (S211). When the user group is designated (S211: Y), information indicating that the incoming user terminal is issuing a request for admission is sent to the representative terminal of the designated user group. Next, it is determined whether the representative terminal of the designated user group permits the admission of the incoming user terminal (S213). If the admission is permitted (S213: Y), the above-mentioned step S209 proceeds to allow the incoming user terminal to access to the representative terminal, peer-to-peer. Otherwise (when all user terminals in the designated user group are in the offline state and thus no user terminal is working as the representative terminal or when the representative terminal of the designated user group denied access from the incoming user terminal) (S213: N), the incoming user terminal is not allowed to join in the designated user group. Instead, the incoming user terminal gains access to the game server 1 (S215). In this case, the incoming user terminal is considered as a "new user group having only one user terminal belonging thereto". Accordingly, the in-game character corresponding to this user terminal participates in the main feature of the game as an independent character without formation of any party. On the other hand, when it is determined in the step S211 that no user group is designated (S211: N), this indicates that the incoming user terminal has no user group to join in. In such a case, the incoming user terminal gains access to the game server 1 as the representative terminal of a new user group (S215).

Next, description is made about how to return a user terminal in the above-mentioned step S209 to the original user group when a user terminal thereof is working as the representative terminal.

The incoming user terminal sends its terminal data to the representative terminal of the user group to which it will return. The representative terminal receives the terminal data and adds them to the user group data to update the user group data. The representative terminal sends the user group data to the incoming user terminal. The incoming user terminal obtains information necessary for future communication with other user terminal(s) in the user group, from the updated user group data supplied from the representative terminal. The incoming user terminal is then ready to communicate with other user terminal or terminals in the user group. After other user terminal or terminals obtain the updated user group data and recognize that the incoming user terminal has joined in the user group, the incoming user terminal obtains terminal data from the user terminal(s).

The operation described in the paragraph just above is again described from the perspective of other user terminal or terminals. Other user terminal or terminals in the user group intermittently obtain the user group data including the group-shared data from the representative terminal. When other user terminal or terminals obtain the updated group-shared data, it/they find(s) out that the incoming user terminal has joined in the user group. Then, other user terminal or terminals communicate with the incoming user terminal, peer-to-peer. In this way, the user terminal is added to the user group.

Figure 7:
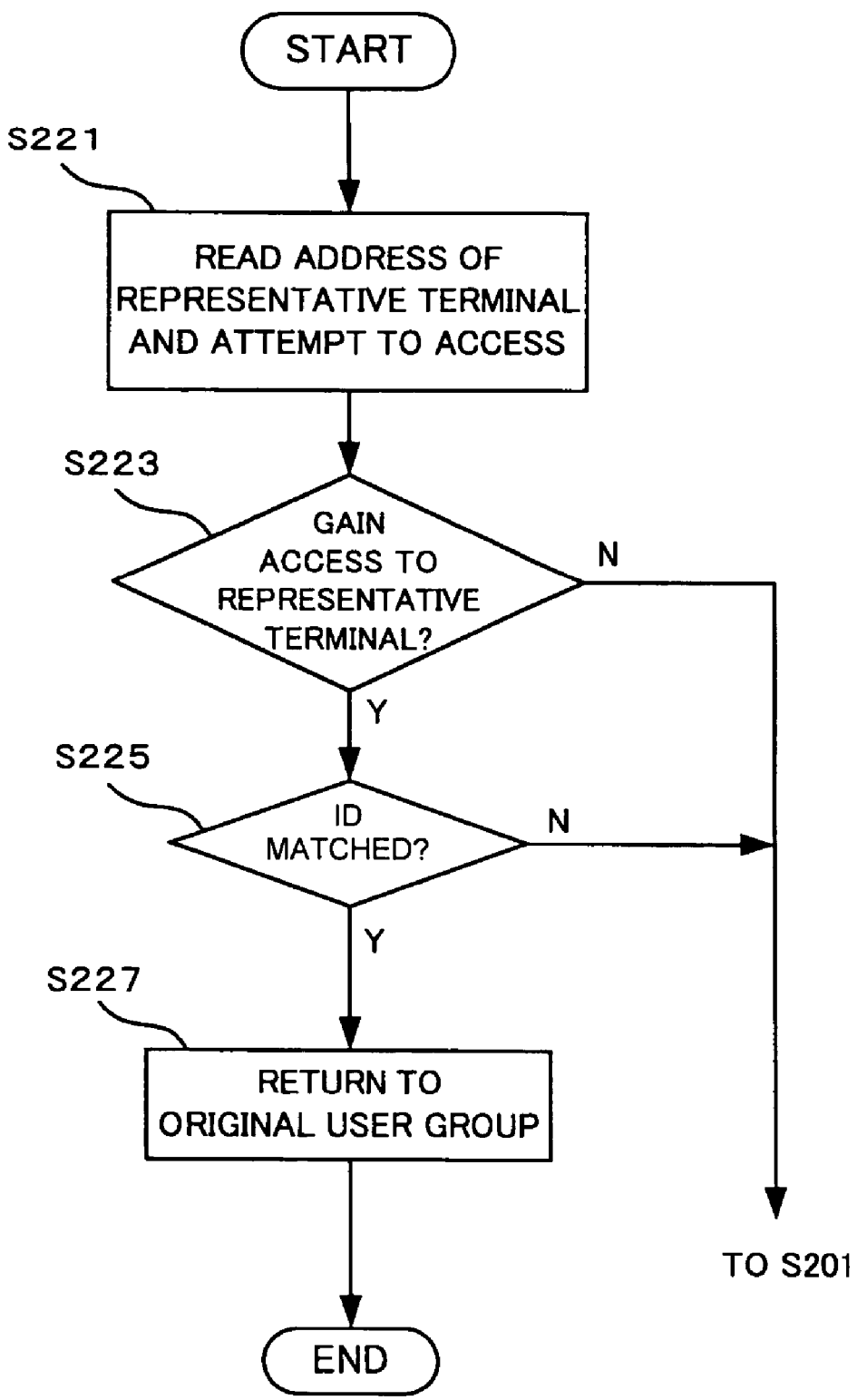
FIG. 7 is a flow chart of an operation for allowing a logged-out user terminal to return to an original user group by directly accessing a representative terminal.

Next, an operation is described for a case where a non-representative user terminal in a certain user group has logged out and later attempts to directly access the representative terminal of the user group which it had belonged to. In this example, the user terminal records an address (IP address in this example) of the representative terminal of the user group which the local user terminal belongs to, on the data recording unit 32 of the local user terminal before the local user terminal has logs out. FIG. 7 is a flow chart of an operation for allowing the logged-out user terminal to return to the original user group.

First, a re-logging-in user terminal reads the address of the representative terminal from the data recording unit 32 of the local user terminal. The re-logging-in user terminal then attempts to access the address (S221). When this attempt succeeds and the re-logging-in user terminal gains access to the representative terminal (S223: Y), the step S225 follows. In the step S225, it is determined whether the ID of a re-logging-in user terminal matches one of the user terminal IDs included in the user group data on the representative terminal which the re-logging-in user terminal has accessed. This determination is made on the representative terminal by obtaining the ID of the re-logging-in user terminal. Of course, the re-logging-in user terminal may read the ID of the user terminal included in the user group data of the representative terminal and perform the above-mentioned determination. When the IDs match (S225: Y), the re-logging-in user terminal is allowed to return to the original user group (S227). Therefore, the in-game character corresponding to the re-logging-in user terminal is kept sleeping on a bed in the ship before this user terminal returns to the user group. The character wakes at the time when the user terminal returns to the user group in the above-mentioned step S227.

Negative (N) results in both steps S223 and S225 indicate that the re-logging-in user terminal failed to access the representative terminal. Accordingly, the step S201 in FIG. 6 follows to allow the re-logging-in user terminal to access the game server.

The representative terminal may have changed by the above-mentioned transfer of the representative right after a user terminal had logged out. In such a case, the user terminal that had logged out before the shifting of the representative terminal accesses directly to the former representative terminal. However, the accessed user terminal is no longer the representative terminal, so an attempt to re-log in that terminal should be failed. One solution to this problem is to record addresses of individual user terminals in the user group before having been logged out. This record makes it possible to re-log in a proper user terminal. For example, when an attempt to access the former representative terminal is failed, the re-logging-in user terminal can access to an address of another user terminal in the same user group. If the next user terminal is in the online state, the re-logging-in user terminal can obtain the address of the current representative terminal from the next user terminal. The re-logging-in user terminal can access to the representative terminal using the obtained address. Alternatively, the representative terminal which replaces the former representative terminal may take over the address of the former representative terminal. This makes it possible for a user terminal that has logged out before the transfer of the representative right to re-log in.

<Data Exchange Between/Among User Groups>

The representative terminal that represents a user group typically bridges the game server 1 and the user terminals in the user group which the representative terminal belongs to. In this embodiment, two user groups A and B are communicated with each other for data exchange among user terminals in the both groups.

Figure 8A:
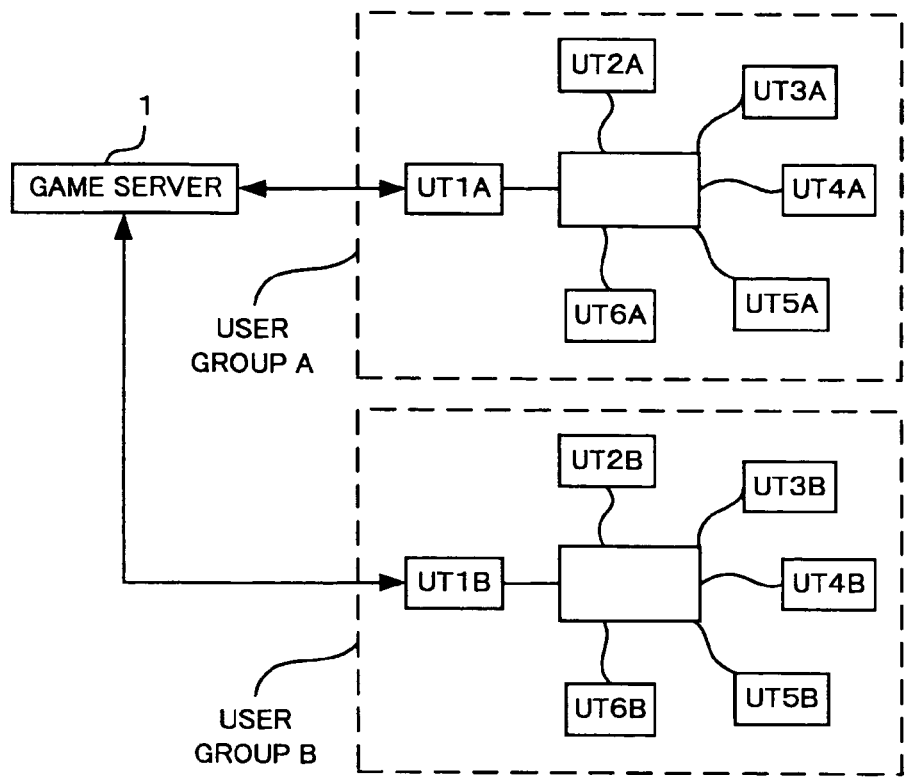
FIGS. 8A and 8B show a schematic configuration of communication between user groups, respectively.
Figure 8B:
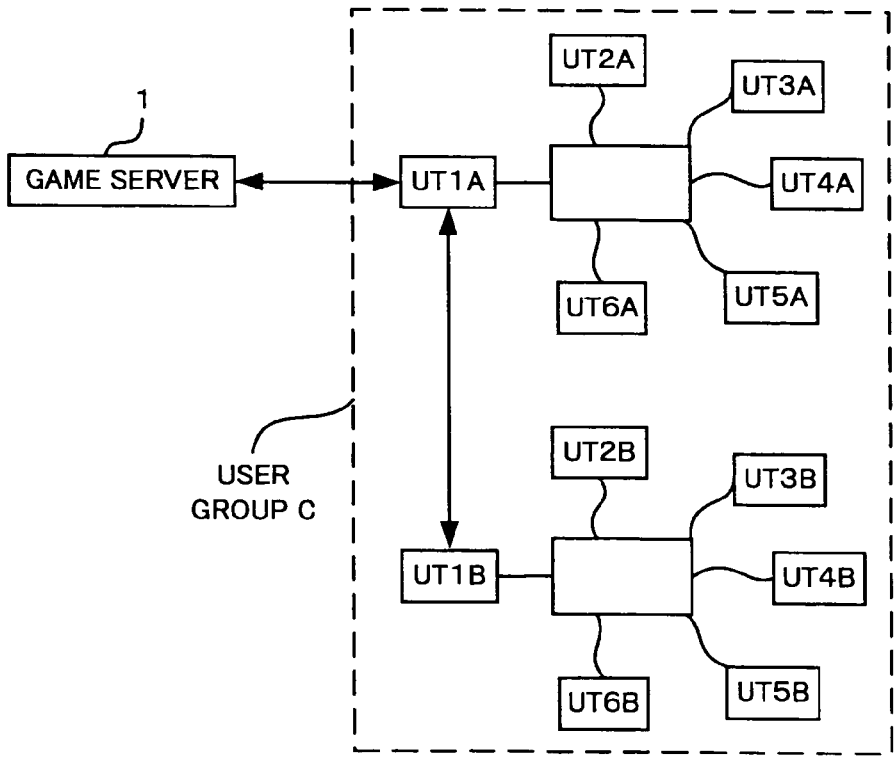

FIGS. 8A and 8B shows schematic diagrams illustrating a relationship between representative terminals and user groups when two user groups are in communication with each other. FIG. 8A corresponds to a case where a user group A and a user group B independently have access to the game server 1. In order to establish communication between these two groups, either one of the representative terminals gains access to the game server 1. In the example shown in FIG. 8B, the representative terminal UT1B of the user group B goes away from the game server 1 and then starts communication with the representative terminal UT1A of the user group A on behalf of the user group B.

In this case, as shown in FIG. 8B, the representative terminal UT1A of the user group A has access to the game server 1. Other user terminals in the user group A can access directly to the representative terminal UT1A, peer-to-peer. Furthermore, the representative terminal UT1A of the user group A communicates with the representative terminal UT1B of the user group B. The representative terminal UT1B of the user group B communicates with the representative terminal UT1A of the user group A. Other user terminals in the user group B can access directly to the representative terminal UT1B, peer-to-peer.

This configuration allows data exchange between the user groups A and B. Only the representative terminal UT1A of the user group A has access to the game server 1. The representative terminal UT1B of the user group B does not directly access to the game server 1. Instead, the representative terminal UT1B of the user group B exchanges necessary data with the game server 1 through the representative terminal UT1A of the user group A. Before the establishment of communication between the user groups A and B, the game server 1 is required to send distributed game data to both representative terminals of the user groups A and B. After the communication has established, the representative terminal UT1A of the user group A is the only user terminal to which the game server 1 is required to send the distributed game data. Loads on the game server 1 can be reduced accordingly. This situation may be considered as a new user group C including the user groups A and B being connected to the game server 1, as shown in FIG. 8B. However, in practice, the representative terminal UT1A of the user group A does not pass the distributed game data supplied from the game server 1 to all user terminals (in the user group C). The representative terminal UT1A sends the distributed game data to other user terminals in the user group A and the representative terminal UT1B of the user group B. Accordingly, the user terminals in the user group B other than the representative terminal receive the distributed game data from the representative terminal UT1B of the user group B.

As described above, if individual user terminal have access to the game server 1, each terminal should receive data independently and separately, even for data that are equally necessary for all user terminals. In contrast, the present embodiment makes the representative terminal receive all such common data. This reduces the amount of data that the game server should send to. A new function or data may be added by utilizing the subtraction difference in data transfer amount from the server.

This embodiment utilizes the subtraction difference in data transfer amount to make correspondence between a user group and an in-game ship or boat. When a character corresponding to a user terminal acts alone in the game, this character is visualized as being riding on a boat. When two or more characters form a party, the characters are visualized as being riding on a ship of a size suitable for the size of the party (i.e., the number of characters on board).

The data to produce a "ship which two or more characters are riding on" are unnecessary for conventional online games with no user group. This amount of data increases the load on the game server. However, the game server according to the present embodiment transfers much smaller amount of data, as described above. This subtraction amount is utilized to send the data associated with the "ship which two or more characters are riding on" to a user group or groups.

In order to form a party in a game, either one of characters may first obtain a ship which affords two or more characters and then the characters who will form a party in the game will board the ship. Alternatively, a character may board a ship of an existing party which does not reach the full capacity of the ship. For example, ships which can hold different number of people (e.g., four people, sixteen people, and sixty-four people) may be provided in a game. The limit on the number of user terminals in a single user group may be the same number as the complement of a corresponding in-game ship. The number of user terminals in a user group may be increased within the range of the complement of the ship obtained by one of characters.

The above-mentioned embodiment uses peer-to-peer communication between user terminals to transmit the distributed game data received from the game server 1 and the user group data which are used for identifying grouped terminals, in order to reduce the loads on the game server.

However, each user terminal may independently receive the distributed game data from the game server 1, without any data exchange between user terminals, and communications between user terminals may be made through the game server 1 (for example, data exchange between the user terminal UT1 and the user terminal UT2 is performed by transmitting data from the user terminal UT1 to the game server 1 with the designation of the user terminal UT2, and the game server 1 transmits the same data to the user terminal UT2). The terminal which generates user group data may be assigned as the representative terminal. The user group data may be transmitted from the representative terminal to each of other user terminals in the user group through the game server 1. A game may be played out in this way.

In such a case, data exchange between user terminals in a peer-to-peer fashion may be replaced by in-terminal communication through the game server 1. Even with in-terminal communication, the above-mentioned formation of a user group, withdrawal from a user group, access and login of a user, and data exchange between/among users may be achieved by means of transferring the user group data between the user terminals through the game server 1.

It is possible to (1) group user terminals rapidly and smoothly in deference to users' intent, (2) reduce the frequency of groupings of user terminals, and (3) allow a logged-out user terminal to return to a user group which it has belonged to, even without peer-to-peer connections. Continuity of the game can thus be maintained.

In the above-mentioned embodiments, the user terminal may be any one of suitable computers or entertainment devices (e.g., PlayStation 2 manufactured by Sony Computer Entertainment Inc.). More specifically, a computer or an entertainment device can be used as a user terminal when it is combined with a program that provides necessary functions. Examples of such functions include, but not limited to, a communication control function required for a user terminal to receive data from a game server, a function to generate user group data, and a function to send the data received from the game server and the user group data to other network game terminals in the same user group. The program in this case may be recorded on a recording medium (such as a CD or a DVD) and be loaded into the subject computer or entertainment device. Alternatively, a purpose-built device or machine which is specifically designed to provide the above-mentioned functions including the communication control function may be used as the user terminal.

Moreover, display-equipped radio communication systems on which programs can be executed, such as cellular phones on which java programs can be executed may be used as a user terminal. The term "computer" as used herein includes radio communication systems of the type described. In one embodiment, a program to be used to provide a communication function and a function to generate user group data is recorded on a game server or a predetermined server other than the game server, in a format downloadable by the radio communication systems. This allows a radio communication system to download a necessary program by accessing the game server or the predetermined server. The radio communication system can thus serve as the user terminal.

What is claimed is:

1. A network game terminal which is accessible to a game server through a predetermined network, comprising:
   first communication control means which is adapted to receive data from the game server over the predetermined network;
   means for generating user group data which is adapted to group the network game terminal and one or more other network game terminal(s) as a user group in order to play out a network game using data received from the game server through said first communication control means, means for generating user group data also generates
   user group data, the user group data including group information with which the game server can recognize the grouped network game terminals as one user group, and
   representative terminal information with which other network game terminal(s) in the user group can recognize the network game terminal as a representative terminal having representative rights with regard to distribution of data received from the game server, wherein the representative rights are transferred to one of the one or more other network game terminal(s) when the network game terminal is no longer recognized as the representative terminal;
   second communication control means which is adapted to send the data received from the game server and the user group data to other network game terminal(s) in the user group; and
   means for selecting one of the one or more other network game terminals as a new representative terminal for the user group when the network game terminal is serving as the representative terminal, and either when the network game terminal attempts to log out the game server or when the network game terminal attempts to withdraw from the user group, the selection of the new representative terminal is based on a predetermined priority order such that if the user group comprises only one other network game terminal in addition to the network game terminal, the means for selecting automatically selects the one other network game terminal as the new representative terminal for the user group.

2. The network game terminal as claimed in claim 1, wherein the network game terminal serves as the representative terminal and receives data from the game server;
   the network game terminal further comprising first recording means on which the user group data are recorded.

3. The network game terminal as claimed in claim 2, wherein the user group data include information representing a status of the user group in the network game.

4. The network game terminal as claimed in claim 2, further comprising second recording means on which data received from the game server through said first communication control means are recorded, the received data including data that are shared by all network game terminals including the network game terminal in the user group.

5. The network game terminal as claimed in claim 4, wherein the data that are shared by all network game terminals in the user group include graphic data to be used in the network game.

6. The network game terminal as claimed in claim 4, further comprising:
   means for sending the data that were received through said first communication control means and recorded on said second recording means, to the new representative terminal when the network game terminal is serving as the representative terminal, and either when the network game terminal attempts to log out the game server or when the network game terminal attempts to withdraw from the user group, the new representative terminal being selected from the other network game terminals that are in communication with the network game terminal in the user group which the network game terminal belongs to.

7. The network game terminal as claimed in claim 2, wherein said first communication control means is for allowing the network game terminal to communicate bi-directionally with the game server and said second communication control means is for allowing the network game terminal to communicate bi-directionally with anyone of other network game terminals in the user group, the network game terminal further comprising:
   terminal data recording means which is adapted to record, on said first recording means, terminal data of the network game terminal as well as terminal data of individual network game terminal(s) that are received from the other network game terminal(s) in the user group, the terminal data being data indicating a status relating to the individual network game terminal(s);
   means for determining whether the user group which the network game terminal belongs to includes other network game terminals in communication with the network game terminal; and
   means for sending the group information recorded on said first recording means and the terminal data for each network game terminal, to the game server, if said determination means determines that no network game terminal is in communication with the network game terminal when the network game terminal is serving as the representative terminal, and either when the network game terminal attempts to log out the game server or when the network game terminal attempts to withdraw from the user group.

8. A game server to which the network game terminal as claimed in claim 7 has access, the game server comprising:

means for recording the group information and the terminal data on third recording means, the group information and the terminal data being supplied from the network game terminal(s), the third recording means being provided on the game server; and means for sending the group information and the terminal data that are recorded on the third recording means to another representative terminal when the representative terminal is abnormally disconnected from the network, the another representative terminal being selected from available network game terminals in the user group which the representative terminal had belonged to.

9. The network game terminal as claimed in claim 1, wherein said second communication control means allows the network game terminal to communicate bi-directionally with anyone of the other network game terminals in the user group, in a peer-to-peer fashion.

10. The network game terminal as claimed in claim 2, further comprising:

terminal data recording means which is adapted to record a set of terminal data on said first recording means, the terminal data indicating a status of each network game terminal, the set of terminal data including the terminal data of the network game terminal and the terminal data received from other network game terminal(s) in the user group; and means for (i) changing a status of an in-game character in response to a predetermined event that affects the status of the in-game character and updating all of the set of the terminal data, the in-game character being a character in a game corresponding to a network game terminal in the user group that is in the logged out state, this changing being made by said changing means when the network game terminal is serving as the representative terminal, and (ii) sending the updated terminal data to the network game terminal in the user group that was in the offline state and has logging-in again.

11. A method to be performed on a network game terminal which is accessible to a game server through a predetermined network, the network game terminal being adapted to receive data from the game server, the method comprising, by a control unit provided in the network game terminal, the step of grouping the network game terminal and one or more other network game terminal(s) as a user group in order to play out a network game in cooperation between the network game terminal and other network game terminal(s) using data received from the game server, generating user group data, the user group data including group information with which the game server can recognize the grouped network game terminals as one user group, and representative terminal information with which other network game terminal(s) in the user group can recognize the network game terminal as a representative terminal having representative rights with regard to distribution of data received from the game server, wherein the representative rights are transferred to one of the one or more other network game terminal(s) when the network game terminal is no longer recognized as the representative terminal;

sending, by the control unit, the data received from the game server and the user group data to other network game terminal(s) in the user group, selecting, by the network game terminal, a new representative terminal for the user group from the one or more other network game terminals in accordance with a predetermined order when the network game terminal is the representative terminal and the network game terminal attempts to logoff the game server or withdraw from the user group; and automatically selecting a connected network game terminal from the user group as the representative terminal for the user group upon determination that the connected network game terminal is a sole member of the user group that will be connected to the game server upon the log off or the withdrawal of the network game terminal.

12. A computer-readable recording medium on which a program is recorded that is used to allow a computer to function as:

first communication control means which is adapted to receive data from a game server over a predetermined network;

means for generating user group data which is adapted to group the computer functioning as a network game terminal and one or more other network game terminals as a user group in order to play out a network game in cooperation between the network game terminal and other network game terminals using data received from the game server through said first communication control means, means for generating user group data being also adapted to generate user group data, the user group data including group information with which the game server can recognize the grouped network game terminals as one user group, and representative terminal information with which other network game terminals in the user group can recognize the network game terminal as a representative terminal having representative rights with regard to the distribution of data received from the game server, wherein the representative rights are transferred to one of the one or more other network game terminals when the local network game terminal is no longer recognized as the representative terminal;

second communication control means which is adapted to send the data received from the game server and the user group data to other network game terminals in the user group; and means for selecting one of the one or more other network game terminals as a new representative terminal for the user group when the network game terminal is serving as the representative terminal, and either when the network game terminal attempts to log out the game server or when the network game terminal attempts to withdraw from the user group, the selection of the new representative terminal is based on a predetermined priority order such that if the user group comprises only one other network game terminal in addition to the network game terminal, the means for selecting automatically selects the one other network game terminal as the new representative terminal for the user group.

13. The computer-readable recording medium as claimed in claim 12, wherein the server is accessible from a plurality of network game terminals through the predetermined network, in such a manner that said program is allowed to be downloaded by said network game terminals.

14. A game server accessible from a plurality of network game terminals through a predetermined network, each of the network game terminals comprising:

first communication control means for bi-directional communication with the game server over the predetermined network; and means which is adapted to group a local network game terminal and one or more other network game terminal(s) as a user group in order to play out a network game in cooperation between the local network game terminal and other network game terminal(s) using data received from the game server through said first communication control means, said means being also adapted to generate group information with which the game server can recognize the grouped network game terminals as one user group, and representative terminal information with which the network game terminal(s) in the user group can recognize a particular one of the network game terminals as a representative terminal having representative rights with regard to distribution of data received from the game server, wherein the representative rights are transferrable to another one of the network game terminal(s) when the particular network game terminal is no longer recognized as the representative terminal;

means for selecting one of the one or more other network game terminals as a new representative terminal for the user group when the local network game terminal is serving as the representative terminal, and either when the local network game terminal attempts to log out the game server or when the local network game terminal attempts to withdraw from the user group, the selection of the new representative terminal is based on a predetermined priority order such that if the user group comprises only one other network game terminal in addition to the local network game terminal, the means for selecting automatically selects the one other network game terminal as the new representative terminal for the user group;

said game server comprising:

first recording means on which the group information supplied from the network game terminal(s) are recorded; and means for identifying, in response to a request for logging-in from a network game terminal which is in the user group and is not in the logged in state, the user group which the requesting network game terminal belongs to, based on the group information and for reading the group information corresponding to the identified user group from said first recording means to send the group information to the requesting network game terminal.

15. The game server as claimed in claim 14, wherein the network game terminal(s) comprise(s) means for sending terminal data to said game server, the terminal data indicating a status associated with the network game terminal(s), said game server comprising:

second recording means on which the terminal data supplied from the network game terminal(s) are recorded;

when a predetermined event occurs that affects the status associated with the network game terminal(s) in the progress of the network game reflecting the effect of the event to a status associated with a network game terminal in an offline state updating the terminal data recorded on said second recording means.

* * * * *